US007950673B2

(12) United States Patent
Reed et al.

(10) Patent No.: US 7,950,673 B2
(45) Date of Patent: May 31, 2011

(54) STAIR CHAIR

(75) Inventors: Jaime C. Reed, Mukwonago, WI (US); Jeffrey J. Krieger, Mukwonago, WI (US); Richard T. Seizer, Wauwatosa, WI (US); Dale F. Baumer, Waukesha, WI (US)

(73) Assignee: Monster Medic, Inc., Brookfield, WI (US)

( * ) Notice: Subject to any disclaimer, the term of this patent is extended or adjusted under 35 U.S.C. 154(b) by 0 days.

(21) Appl. No.: 12/404,114

(22) Filed: Mar. 13, 2009

(65) Prior Publication Data

US 2009/0230638 A1 Sep. 17, 2009

Related U.S. Application Data

(60) Provisional application No. 61/036,383, filed on Mar. 13, 2008.

(51) Int. Cl.
*B62B 5/02* (2006.01)

(52) U.S. Cl. .................... 280/5.22; 180/8.2; 297/344.21

(58) Field of Classification Search ................... 180/8.2; 280/5.22, 304.1; 297/344.21
See application file for complete search history.

(56) References Cited

U.S. PATENT DOCUMENTS

| | | | | |
|---|---|---|---|---|
| 1,087,928 | A | 2/1914 | Diemer | |
| 1,155,916 | A | 10/1915 | Grout | |
| 1,341,470 | A | 5/1920 | Kinnard | |
| 1,949,282 | A | 2/1934 | Murray | |
| 2,072,222 | A | 3/1937 | Schuttkus | |
| 2,715,533 | A | 8/1955 | Strausburg | |
| 2,883,731 | A | 4/1959 | Wells | |
| 3,106,980 | A | 10/1963 | Rogneby | |
| 3,178,193 | A | 4/1965 | Grogan | |
| 3,231,290 | A | 1/1966 | Weyer | |
| 4,033,595 | A | 7/1977 | Mauch | |
| 4,136,888 | A | 1/1979 | Bowie, Jr. et al. | |
| 4,360,213 | A | 11/1982 | Rudwick et al. | |
| 4,473,234 | A | 9/1984 | Egen | |
| 4,556,229 | A | 12/1985 | Bihler et al. | |
| 4,566,706 | A | 1/1986 | Bihler et al. | |
| 4,913,264 | A * | 4/1990 | Voves et al. | 187/201 |
| 4,962,941 | A | 10/1990 | Rembos | |
| 4,966,392 | A * | 10/1990 | Featon et al. | 280/801.1 |
| 5,036,929 | A * | 8/1991 | Trougouboff | 180/8.2 |
| 5,108,054 | A | 4/1992 | Degand | |
| 5,230,405 | A * | 7/1993 | Bartelt | 187/201 |
| 5,338,048 | A | 8/1994 | Medina | |
| 5,390,389 | A | 2/1995 | Rutkowski et al. | |
| 5,466,040 | A | 11/1995 | Fainsztein | |

(Continued)

FOREIGN PATENT DOCUMENTS

| | | |
|---|---|---|
| GB | 1046444 | 10/1966 |

(Continued)

*Primary Examiner* — Tony H. Winner
(74) *Attorney, Agent, or Firm* — Andrus, Sceales, Starke & Sawall LLP

(57) ABSTRACT

A chair configured for transporting a subject (e.g., up or down an elevated surface (e.g., a stairway, a curb, a ramp, etc.)) and methods of using the same is provided. In particular, a chair comprising a rail assembly, a pair of back legs and a pair of front legs, wherein the rail assembly is fastened to the back legs and wherein the back legs and front legs are interconnected via a pair of side rails and a seat assembly, wherein the seat assembly comprises a seat frame and a swivel seat assembly, and methods of using the same (e.g., to load and/or unload a subject onto the chair and/or to transport a subject) are provided.

6 Claims, 23 Drawing Sheets

U.S. PATENT DOCUMENTS 5,533,594 A * 7/1996 Tremblay et al. ............. 187/201
5,687,942 A * 11/1997 Johnson ................... 248/223.41
5,992,935 A * 11/1999 Duijnstee ................. 297/344.21
6,168,234 B1 * 1/2001 Haynes et al. ........... 297/344.23
6,231,016 B1 * 5/2001 Slone ......................... 248/200.1
6,343,805 B1 2/2002 Roy
6,360,833 B1 3/2002 Valencia
6,435,538 B2 8/2002 Ellis et al.
6,644,675 B2 11/2003 Ellis et al.
6,648,343 B2 11/2003 Way et al.
7,325,815 B2 2/2008 Rush
7,520,347 B2 * 4/2009 Chambliss et al. ............ 180/8.2

FOREIGN PATENT DOCUMENTS

JP 2006-055286 3/2006
WO 01/08624 2/2001

* cited by examiner

STAIR CHAIR

This Application claims priority to U.S. Provisional Patent Application Ser. No. 61/036,383, filed 13 Mar. 2008, hereby incorporated by reference in its entirety.

FIELD OF THE INVENTION

The present invention relates to a chair configured for transporting a subject (e.g., up or down an elevated surface (e.g., a stairway, a curb, a ramp, etc.)) and methods of using the same. In particular, the present invention provides a chair comprising a rail assembly, a pair of back legs and a pair of front legs, wherein the rail assembly is fastened to the back legs and wherein the back legs and front legs are interconnected via a pair of side rails and a seat assembly, wherein the seat assembly comprises a seat frame and a swivel seat assembly, and methods of using the same (e.g., to load and/or unload a subject onto the chair and/or to transport a subject).

BACKGROUND OF THE INVENTION

An Emergency Medical Technician (EMT) is an emergency responder trained to provide medical services to the ill and injured. Once thought of as an "ambulance driver or attendant," the modern EMT performs many more duties than in the past, and responds to many types of emergency calls, including medical emergencies, hazardous materials exposure, mass casualty/triage events, childbirth, patient transport, fires, rescues, injuries, trauma and other types of calls. EMTs may be part of an Emergency Medical Service (EMS), hospital-based EMS, fire department, or independent response team.

EMTs are trained in practical emergency medicine and skills that can be deployed within a rapid time frame. In general, EMT intervention aims to expedite the safe and timely transport of a subject (e.g., to a hospital for definitive medical care, or from one location to another).

EMTs and other emergency responders (e.g., firefighters, law enforcement individuals, etc.) often utilize evacuation and/or stair chairs to transport subjects. These chairs have been developed to assist a responder to move a subject up and/or down stairs as well as across surfaces.

Conventional stair chairs generally include a main frame comprising a seat as well as a rail assembly comprising a plurality of rollers, a track and/or other components to assist movement of the chair (e.g., supporting a subject) up and/or down stairs. Various stair chairs are described in U.S. Pat. Nos. 4,136,888 to Bowie, Jr. et al.; 4,473,234 to Egen; 5,466,040 to Fainsztein; 5,338,048 to Medina; 5,992,935 to Duijnstee; 6,343,805 to Roy; 6,360,833 to Valencia; 6,435,538 to Ellis and Ward; 6,644,675 to Ellis and Ward; 6,648,343 to Way et al.; and 7,325,815 to Rush.

However, each of the chairs of these disclosures can be further improved. For example, a chair that is more patient/subject friendly (e.g., that is easier for a subject to be loaded and unloaded onto the chair for transport); and that is more user (e.g., EMT, firefighter or other type of emergency responder that uses a chair to transport a patient) friendly (e.g., easier for a user to load and unload a subject, to secure a patient/subject transported by a chair to the chair (e.g., for the safety of the subject and/or emergency responder)); and that provides features that assist emergency responders to perform their job efficiently and effectively) would be beneficial.

DETAILED DESCRIPTION OF THE INVENTION

Figure 1:
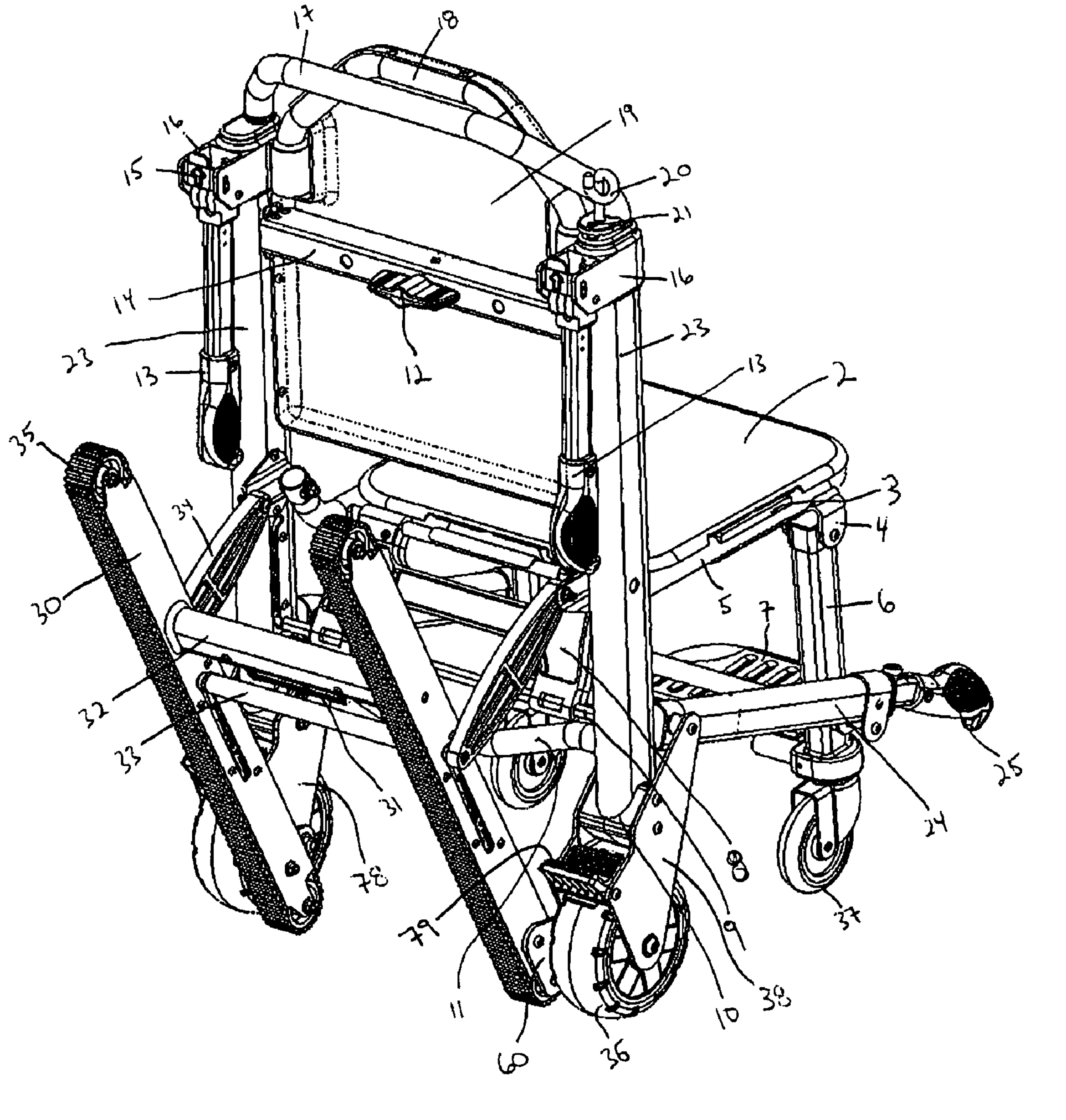
FIG. 1 shows a chair according to the invention.

The present invention relates to a chair configured for transporting a subject (e.g., up or down an elevated surface (e.g., a stairway, a curb, a ramp, etc.)) and methods of using the same. In particular, the present invention provides a chair comprising a rail assembly, a pair of back legs and a pair of front legs, wherein the rail assembly is fastened to the back legs and wherein the back legs and front legs are interconnected via a pair of side rails and a seat assembly, wherein the seat assembly comprises a seat frame and a swivel seat assembly, and methods of using the same (e.g., to load and/or unload a subject onto the chair and/or to transport a subject).

The following embodiments are provided by way of example and are not intended to limit the invention to these particular configurations. Numerous other applications and configurations will be appreciated by those of ordinary skill in the art.

A chair system of the present invention is depicted in the drawings. For example, a chair system embodied by the invention is shown in FIGS. 1-21.

Figure 2:
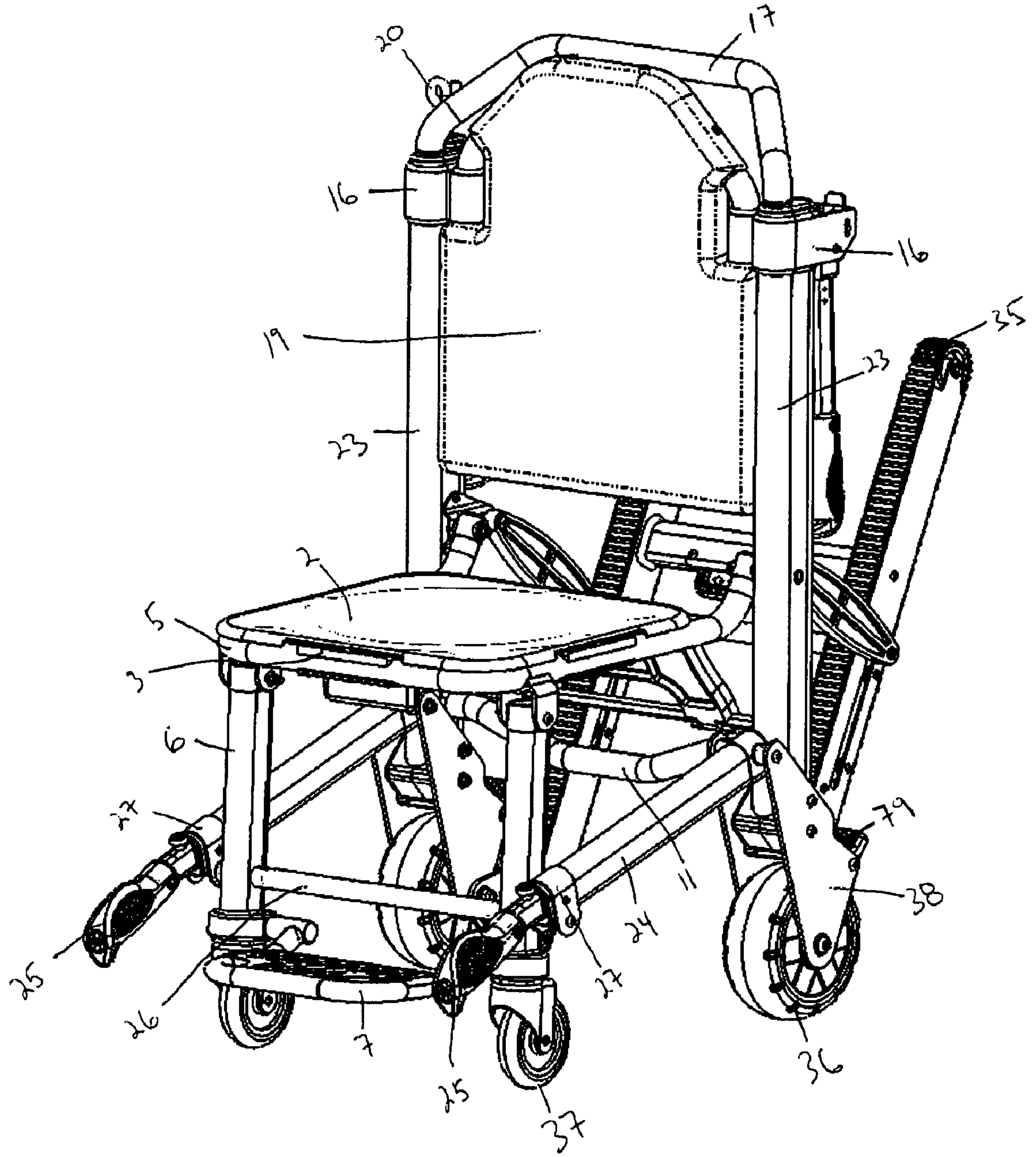
FIG. 2 shows a chair according to the invention.

For example, in some embodiments, the present invention provides a compact and fully collapsible chair system 1 (e.g., for transporting a subject up and/or down a surface (e.g., stairway)) comprising a seat assembly comprising a fixed back seat portion 19 and a swivel seat assembly comprising a swivel seat 2 (e.g., that assists patient loading onto the chair and patient unloading from the chair (e.g., as shown in FIGS. 1-2). The present invention also provides a shoulder specific restraint system assembly (e.g., comprising a plurality of quick-clip restraint anchors/mounts 72 (e.g., shown in FIG. 15) for a quick-clip shoulder restraint system provided herein)) and a lap specific restraint assembly (e.g., for use in securing a subject to a chair described herein (e.g., during transport of a subject up and/or down a surface, or while loading into a vehicle for transport)). The present invention also provides additional chair components (e.g., a telescoping intravenous (IV) pole 20 (e.g., shown in FIG. 1)) configured to assist user's of the chair (e.g., while transporting a subject in the chair).

In some embodiments, a chair system 1 provided herein comprises a rail assembly, a pair of back legs 23 and a pair of front legs 6, wherein the rail assembly is fastened to the back legs 23 and wherein the back legs 23 and front legs 6 are interconnected via a pair of side rails 24 and a seat assembly, wherein the seat assembly comprises a seat frame 5 and a swivel seat assembly (e.g., as shown in FIGS. 1, 2, 13 and 14 (e.g., to load and/or unload a subject onto the chair and/or to transport a subject)), and methods of using the same.

Figure 3:
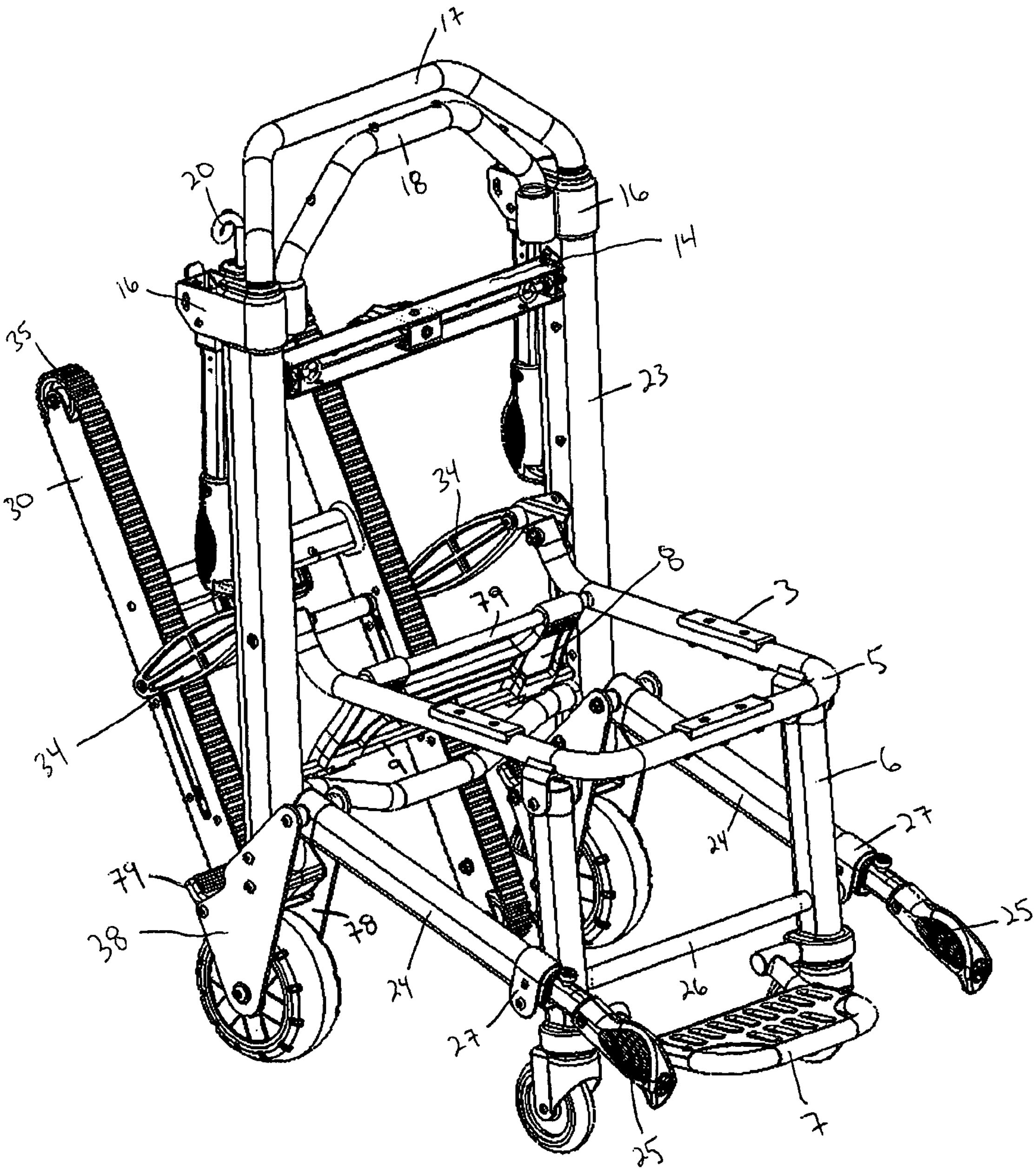
FIG. 3 shows a chair according to the invention with components of the seat assembly and seat back removed.
Figure 5:
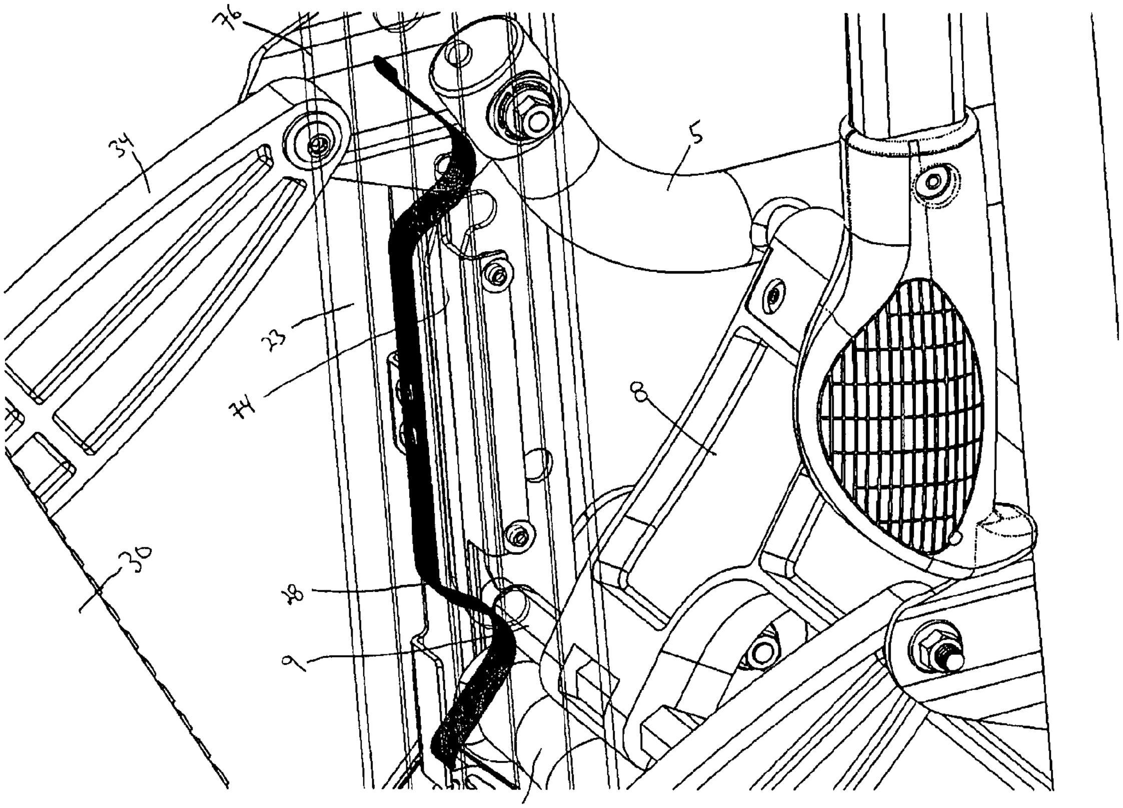
FIG. 5 shows a transparent view of a back leg of a chair of the invention including components attached thereto and housed within.
Figure 12:
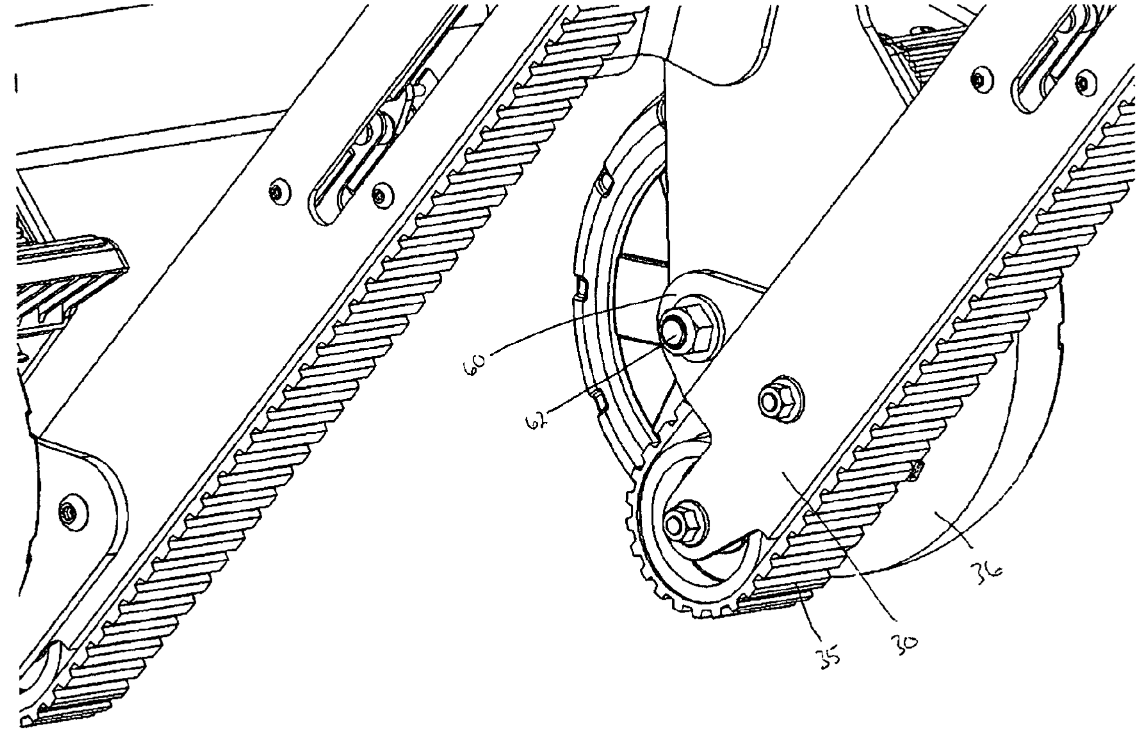
FIG. 12 shows components of a rail assembly including a triangular track frame assembly mount plate and its attachment to a track frame and to a wheel of a chair of the invention.

For example, FIG. 1 shows a chair system 1 according to the invention. The chair system 1 includes a pair of back legs 23 and a pair or front legs 6, wherein a seat frame 5 is pivotally attached to the back legs 23 and is fastened to a pair of connectors 4 fastened to the seat frame 5, wherein the connectors 4 are pivotally connected to a top portion of the front legs 6. The chair 1 is supported by a pair of front wheels 37 and a pair of back wheels 36. The chair 1 comprises a right and a left inner back wheel attachment plate 78 (e.g., as shown in FIGS. 1 and 3, each fastened to the inside portion of the right back wheel or left back wheel, respectively, relative to configuration of the chair) and a right and a left outer back wheel attachment plate 38 (e.g., as shown in FIGS. 1 and 3, each fastened to the outside portion of right back wheel or left back wheel, respectively, exposed on the outside of the chair relative to configuration of the chair). Each pair of wheel attachment plates 38, 78 (comprising right inner and right outer back wheel attachment plates, or left inner and left outer back wheel attachment plates) are fastened to either the right or to the left rear leg 23, respectively, via a wheel mount cap 10 located on the bottom portion of each rear leg 23. Each pair of left and right back wheel attachment plates 38, 78 pivotally fasten to either the right or left side rail 24, respectively (e.g., as shown in FIG. 3). Each pair of left and right back wheel attachment plates 38, 78 attach to a rear wheel 36. The inner back wheel attachment plates 78 each fasten to a triangular track frame assembly mount 60 to which a track frame 30 is fastened (e.g., as shown in FIG. 12). As shown in FIG. 1, a wheel brake 79 is rotatably attached to each pair of wheel attachment plates 38, 78. A lower back brace 11 (e.g., tube) and an upper back brace 14 is fastened to and connects each rear leg 23 (e.g., to provide support and maintain rigidity of chair structure). Similarly, a lower front brace 26 is fastened to and connects each front leg 6. A seat lock rod 9 is slidably fastened to each rear leg 23 (e.g., as shown in FIGS. 1, 3, and 5). A seat lock link 8 pivotally fastens to the seat lock rod 9 and to a seat frame rod 79. As shown in FIG. 5, each end portion of the seat lock rod 9 is configured to travel (e.g., slide) within a track 74 cut out of an inner-facing surface of the rear legs 23 (e.g., from a locked deployed state to a locked folded/collapsed state). The seat lock rod 9 is pushed into grooves present in the track 74 by a seat lock spring 28.

In some embodiments, the chair comprises caster forks that are attached to a bracket attached to the bottom portion of the front legs 6, wherein the caster forks are attached to front wheels 37. A chair of the present invention may use any type of bracket and/or caster fork well known to those in the art. The chair 1 comprises a foot support 7 that is rotatably fastened to the brackets attached to the bottom portion of the front legs 6 (e.g., as shown in FIG. 2 (e.g., such that the foot support 7 can be placed in a stowed or a deployed position)). In some embodiments, the foot support 7, when deployed, is configured to allow a subject seated on a chair provided herein to place their feet in a position such that their feet are not under any portion of their body (e.g., their legs). In some embodiments, the present invention utilizes front wheels 37 that are about 4 inches in diameter and about 1 inch wide. In some embodiments, a chair of the invention utilizes rear wheels that are about 6.5 inches in diameter and about 2.5 inches wide.

The present invention is not limited by the type of wheels utilized. In some embodiments, chair wheels are constructed of rubber, plastic, composite (e.g., polycarbonate), or other type of material. It is preferred that the wheel material is not too hard (e.g., thereby reducing chair vibration) nor too soft or porous (e.g., such that debris (e.g., rocks, glass, mud, etc.) could collect and/or build up in and/or on the wheels). In some embodiments, chair wheels comprise greaseless, sealed bearings (e.g., titanium or other metallic bearing (e.g., that prevent entrance of patient body fluids, water, snow, or other fluids). In some embodiments, the bearings provide a smooth roll of the chair and permit a user to maneuver the chair more easily (e.g., with less back twist and/or torsion). In some embodiments, wheel bearings prevent wheel wobble.

The present invention is not limited by the size of the wheels utilized. In some embodiments, the diameter of the wheels utilized is greater than 6.5 inches, although larger (e.g., greater than 6.7 inches, greater than 7 inches, greater than 7.5 inches, greater than 8 inches or larger) and smaller (e.g., diameter greater than 3 inches, greater than 4 inches, greater than 4.5 inches, greater than 5 inches, greater than 6 inches) are utilized. In some embodiments, the width of a wheel is 1-1.5 inches, 1.5-2.0 inches, 2.0-2.5 inches, 2.5-3.0 inches, 3.0-3.5 inches or larger. In some embodiments, the wheels utilized are 6.5 inches in diameter and are 2.25 inches wide. Wider wheels provide superior handling and maneuverability over rough terrain and also provide a lower initial push weight to get a chair moving (e.g., rolling). In some embodiments, chair wheels comprise a customizable trim ring on the sidewall of the wheel (e.g., that permit users (e.g., purchasers of a chair of the present invention)) to customize the chair (e.g., the wheels). In some embodiments, a user may utilize alpha numeric characters for customization (e.g., for departmental customization (e.g., City Fire, City EMS, etc.). The trim ring and/or alpha numeric characters may be any color (e.g., thereby permitting easy recognition of a chair (e.g., thereby reducing "chair confusion" in a mass casualty or multiple service response)). In some embodiments, the wheels comprise a camber (e.g., that provides the least amount of resistance to roll while providing sufficient surface contact for maximum traction). In some embodiments, the wheels comprise a tread pattern that permits maximum traction, water, snow and/or ice displacement, and/or low resistance.

Figure 6:
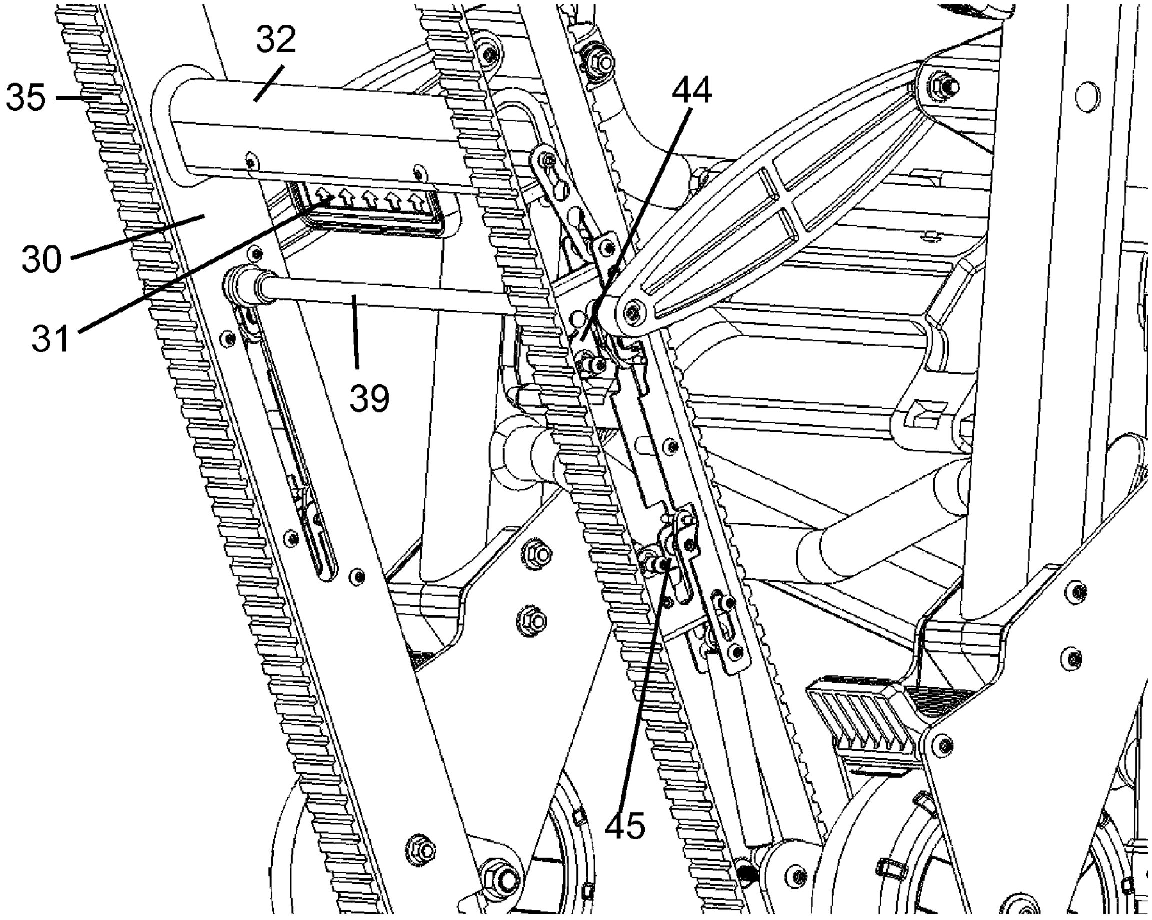
FIG. 6 shows components of a rail assembly with a track frame component removed in order to show a rotary latch and other components housed with a track frame of a chair according to the invention.
Figure 7:
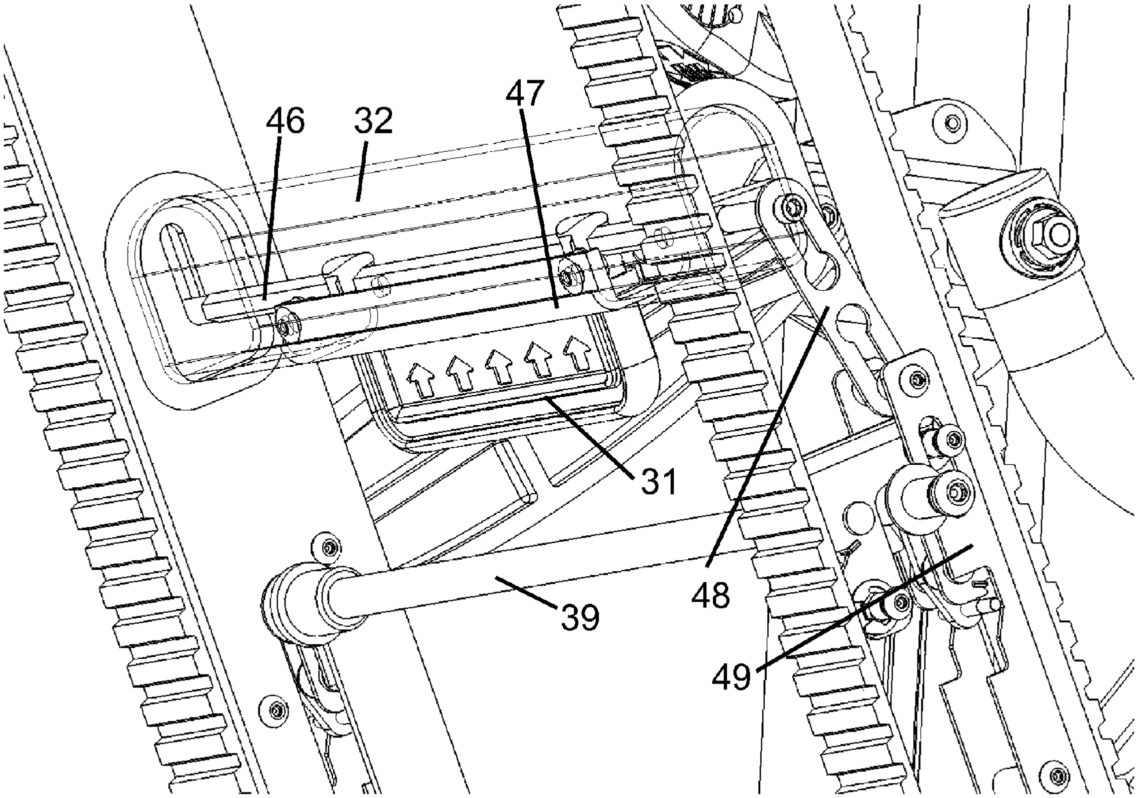
FIG. 7 shows components of a rail assembly including a track cross tube, release handle, and track rod of a chair of the invention.
Figure 8:
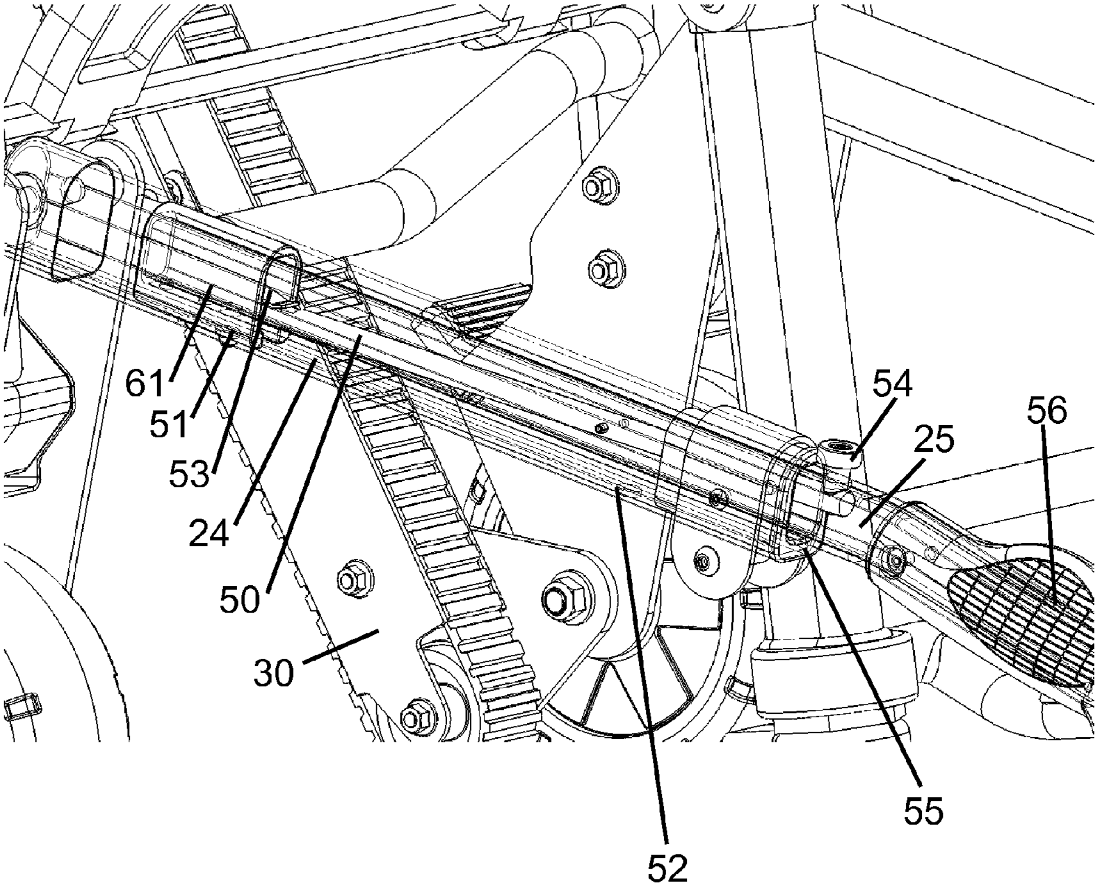
FIG. 8 shows a transparent view of a side rail comprising a telescoping side rail handle and other components of a chair of the invention.

As shown in FIGS. 1, 2, 3, 6, 7, and 12, a chair of the invention comprises a rail assembly. The rail assembly comprises a pair of track frames 30 around which an endless track 35 extends. In some embodiments, the track 35 comprises an outer surface (e.g., that contacts a surface (e.g., a stair)). The tracks 35 also comprise an inner surface (e.g., that guides the tracks to roll along the track frames as the chair is moved up or down a surface (e.g., a surface upon which the rail assembly would contact as the chair is raised or lowered upon the surface (e.g., a flight of stairs)). Rollers at the end of the track frame 30 allows for proper tension on the tracks 35 while not restricting track 35 movement In some embodiments, the track 35 length is such that the tracks 35 engage the edge of at least two stairs at a time (e.g., during movement up and/or down the stairs). In some embodiments, the tracks are similar to tracks disclosed in U.S. Pat. No. 6,648,343 issued to Way et al., or to those disclosed in U.S. Pat. No. 4,473,234 issued to Egen, each of which is hereby incorporated by reference in its entirety for all purposes. The rail assembly also comprises a pair of track links 34 wherein each track link 34 is fastened to an extruded portion 76 fastened to a rear leg 23, and to a track rod 39 (e.g., shown in FIG. 6) housed within a track tube 33 (e.g., shown in FIG. 1). A track cross tube 32 is fastened to each track frame 30 and is also attached to a track release handle 31, and houses a track release handle bushing 47 (e.g., that is fastened (e.g., riveted) to the cross tube 32) and a track release rod 46 (e.g., as shown in FIG. 7). The track release rod 46 is attached to a slider release link 48, which in turn is attached to a slider release assembly 49. The slider release assembly 49 comprises a rotary latch for the track rod 39 when the chair is in a deployed position 44, and a rotary latch for the track rod 39 when the chair is in a non-deployed position 45. As shown in FIG. 6, each track frame 30 comprises an orifice through which the track rod 39 moves. Each track frame 30 is fastened to a triangular track frame assembly mount 60 that is pivotally attached to the inner back wheel attachment plate 78 (e.g., as shown in FIGS. 1 and 8). As seen in FIGS. 8 and 12, a chair of the invention comprises a triangular track frame assembly mount 60 attached to the track frame 30 and inner wheel attachment plates 78, wherein the triangular track frame assembly mounts 60 and attached track frames 78 pivot about an axis of rotation shared by the axis of rotation of the rear wheels 36 (e.g., the attachment 62 (e.g., via a bolt) of the triangular track frame assembly mounts 60 is through the center axis of the rear wheels 36).

In some embodiments, to release a rail assembly of a chair of the invention, a user pulls the track release handle 31. Pulling the track release handle 31 moves the track release rod 46 which pulls the slider release assembly 49. As the slider release assembly 49 moves, it unlocks the rotary latch for track rod 44, allowing the track rod 39 to slide freely in slots in the track frame 30. The triangular track frame assembly mount plate 60 allows the track frame 30 to pivot on the center axis of wheel 62.

As shown in FIG. 1, a chair 1 of the invention also comprises a pair of back handles 13 that are pivotally attached to handle mounts 16 attached to the rear legs 23. A rear handle release lever 15 controls release of the rear handles 13.

Pushing rear handle release lever 15 forces a pin to slide in the vertical slot in handle mount 16. As the pin moves up, it disengages from locking features on rear handle 13, allowing it to rotate.

Figure 4:
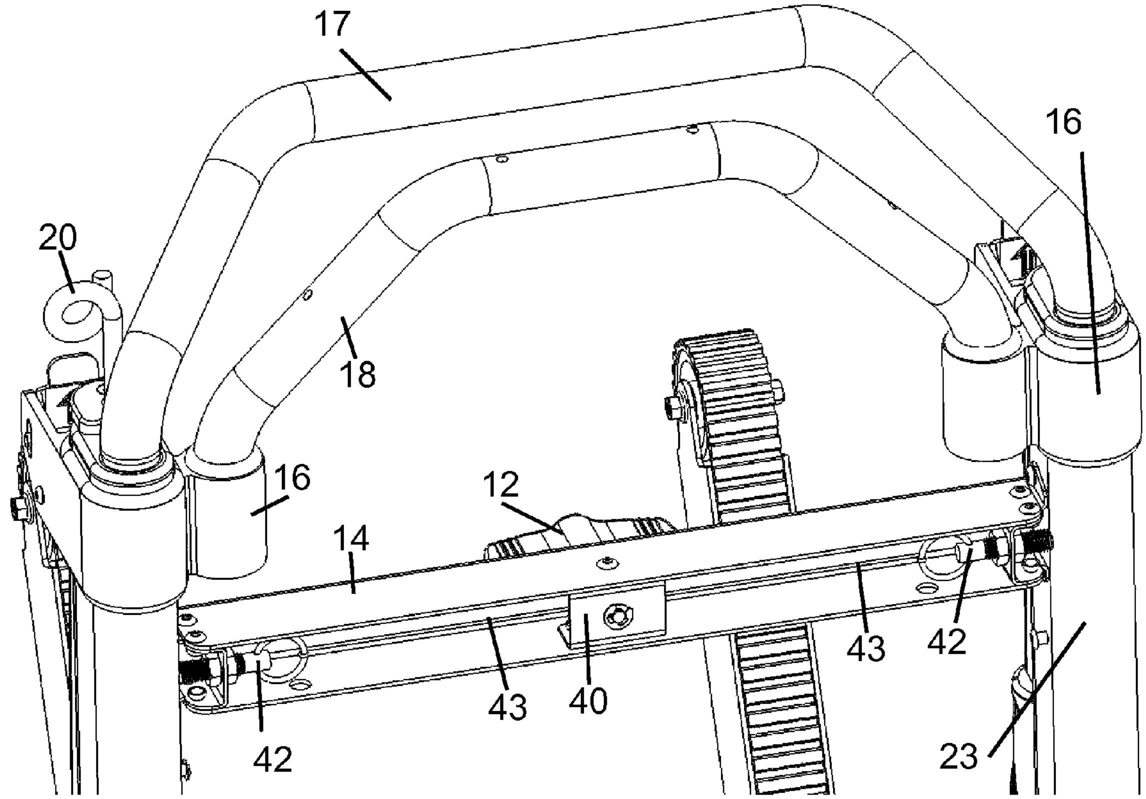
FIG. 4 shows components of a chair of the invention including a telescoping rear control handle, head frame, back brace and telescoping IV pole.

A chair of the invention also comprises a telescoping rear/control handle 17, wherein movement (e.g., into a deployed position) of the of the rear/control handle 17 is controlled by a rear/control handle release 12 attached to the upper back brace 14 (e.g., as shown in FIG. 4 (e.g., thereby providing an easily accessible and easily usable release for the handle 17). As shown in FIG. 4, wherein the upper back brace 14 is shown with a portion removed such that the components housed inside are visible, a control handle pivot bracket 40 is fastened (e.g., via rivets) to the upper back brace 14 and to which the rear/control handle release 12 is attached. In some embodiments, the rear/control handle is ergonomically designed to provide a "power grip" hand position for a user of the chair (e.g., when descending stairs with a subject supported on the chair).

Cable 43 passes through a hole in handle release 12. As handle release 12 is rotated, it puts tension on cable 43. The ends of cable 43 are attached to spring plungers 42. As the rings on the spring plungers 42 are pulled, the nose of the spring plungers are retracted from holes in the rear/control handle 17, allowing it to move.

As shown in FIGS. 1 and 8, a chair of the invention also comprises a telescoping side rail handle assembly. FIG. 8 provides a view of a side rail 24 made transparent to view components therein. The side rail handle assembly comprises a telescoping side rail handle 25 and a side rail handle grip 56 fastened thereto, wherein the side rail handle 25 is fastened to a side rail handle lock bar 50 comprising a lock pin. The lock pin is configured on the rail handle lock bar 50 in such a way as to engage one of a plurality of lock pin engagement holes 51, 52 (e.g., wherein the lock pin engagement hole 51 is a hole in which the lock pin engages when the side rail handle 25 is in a retracted position, and wherein the lock pin engagement hole 52 is a hole the lock pin engages when the side rail handle 25 is in a deployed position). The telescoping side rail handle 25 is also attached to a slide handle bushing 61 (e.g., that slides within the side rails 24). The slide handle bushing 61 comprises a lock bar spring 53 that provides a constant force pushing the lock pin attached to the side handle lock bar 50 downward against the inside bottom face of the side rail 24. The side handle lock bar 50 is also attached to a lock bar button 54 (e.g., upon which a user of the chair can push to overcome the force provided by the lock bar spring 53 and movement of the lock pin out of a lock pin hole 51, 52 (e.g., at which point the side rail handle 25 can be moved (e.g., in a telescoping manner into and/or away from the side rail 24 (e.g., via the side handle bushing 61 sliding along the inside surface of the side rail 24))).

A chair of the present invention also comprises a seat back 19. As shown in FIGS. 1 and 2, a seat back 19 of a chair of the invention is fastened to (e.g., riveted to) the rear legs 23, as well as to a head frame 18 attached to handle mounts 16 fastened to the rear legs 23.

Figure 13:
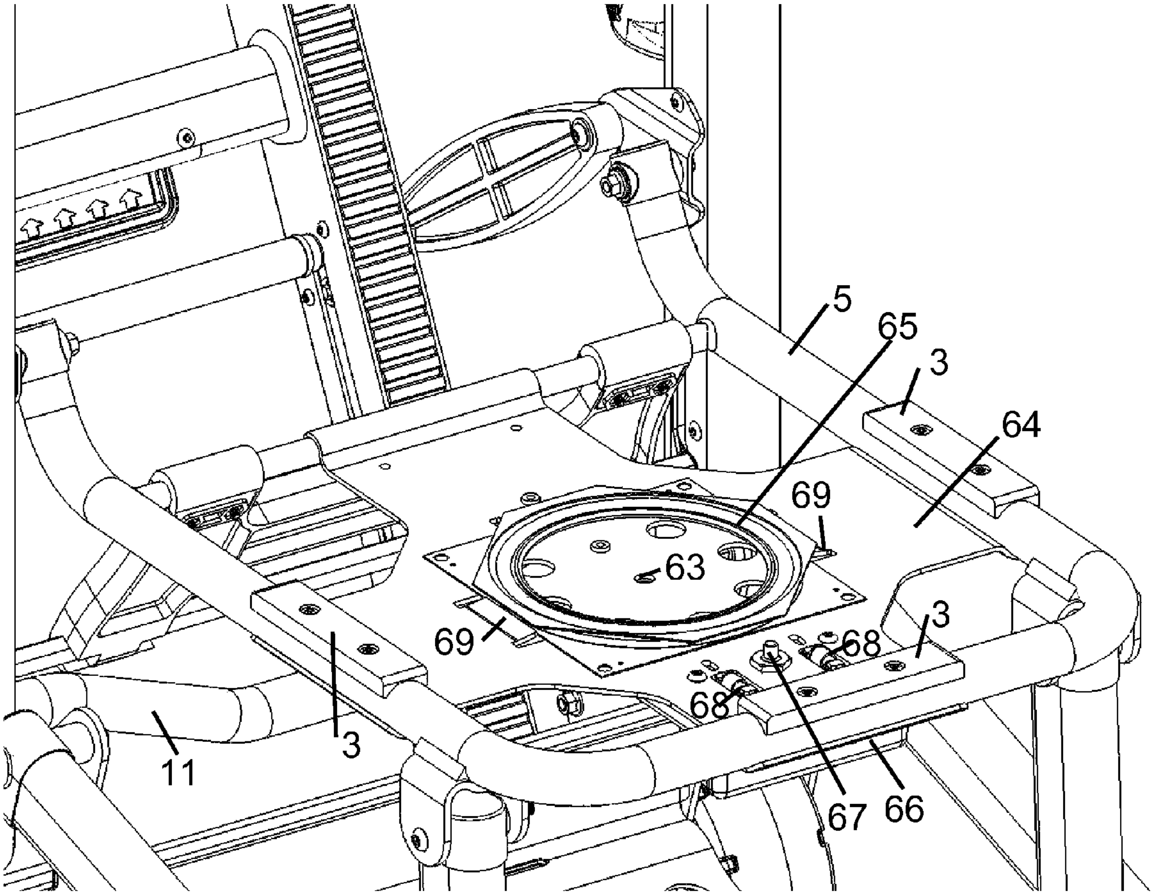
FIG. 13 shows components of a seat assembly of a chair of the invention.
Figure 14:
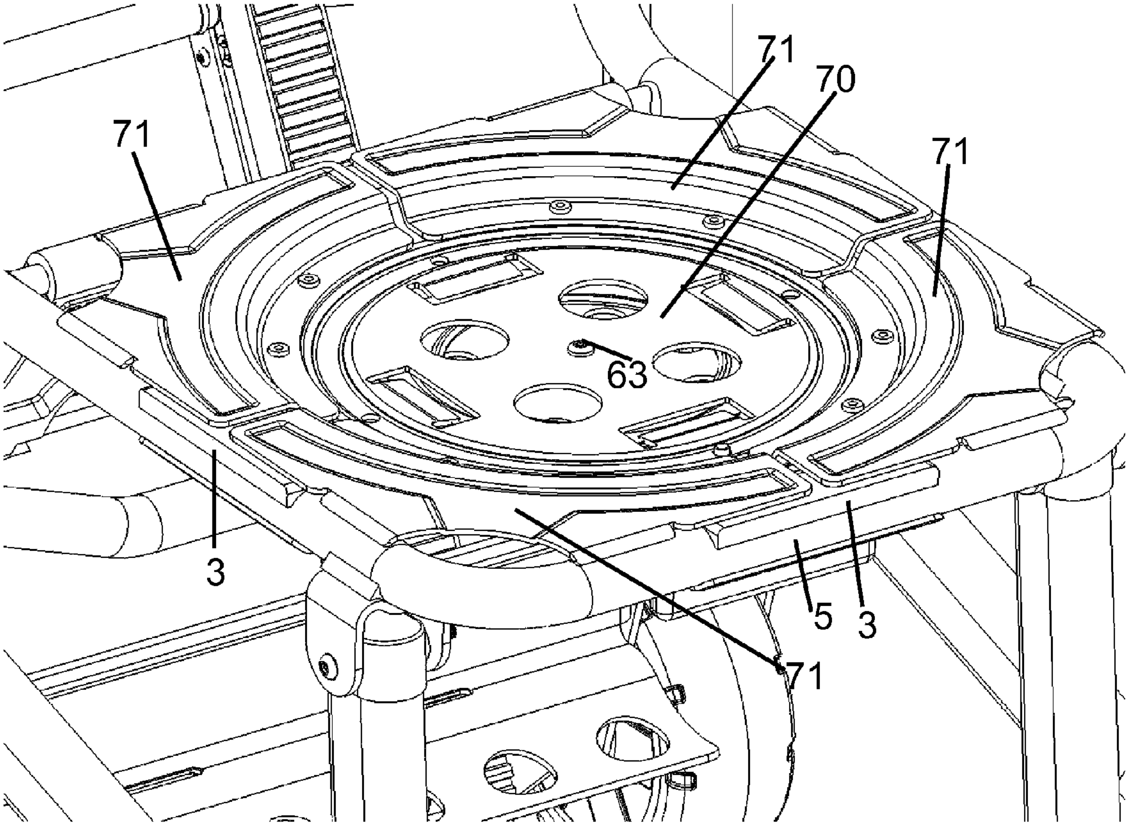
FIG. 14 shows components of a seat assembly of a chair of the invention.

A chair of the present invention also comprises a swivel seat assembly comprising a swivel seat 2. The swivel seat 2 is attached to a chair of the invention via components shown in FIGS. 13 and 14 (e.g., in which the swivel seat 2 is removed in order to view components attached thereto). As shown in FIG. 13, a swivel seat base 64 is fastened to the seat frame 5. Also attached to the seat frame 5 are a plurality of seat glides 3. A turntable bearing assembly 65 is located upon the seat base 64 such that the pivot point of the seat 63 is centered therein. A number of fasteners 69 (e.g., tabs) are affixed to the seat base 64 and fasten the turntable bearing assembly 65 to the seat base 64. A swivel seat plate 70 is fastened to the turntable bearing assembly 65. Four separate seat pan portions 71, that attach to the swivel seat 2, are fastened to the seat plate 70, and rotatably move along the seat glides 3, thereby providing movement of the swivel seat 2 about the swivel seat pivot point 63.

In one embodiment, a swivel seat of a chair of the present invention is moved (e.g., swiveled) by pulling on a pivot seat handle 66 towards the front of the chair 1, thereby disengaging the swivel seat spring plunger 67 from the swivel seat plate 70. Disengagement of the spring plunger 67 allows the swivel seat plate 70, seat pan 71, and swivel seat 2 to rotate on the turntable bearing assembly 65. In some embodiments, there is a hole every 90 degrees on the swivel seat plate 70 that the swivel seat spring plunger 67 engages to prevent further rotation. Thus, in some embodiments, the swivel seat 2 is able to rotate through 360 degrees (e.g., locking every 90 degrees). Thus, in some embodiments, a swivel seat 2 of the present invention does not comprise a home or loading position.

In some embodiments, a user of a chair of the present invention unfolds a chair of the present invention (e.g., from a folded position) by pulling on the seat lock rod 9 and disengaging the seat lock rod 9 from the seat lock spring 28. This allows a user to pivot the seat frame 5 into an open position (e.g., a position in which the seat is parallel to the surface upon which the chair resides), causing the seat lock rod 9 to move down the tracks 74 in the back legs 23. A user can push on the seat frame 5 to lock the seat lock bar 9 with the seat lock spring 28 (e.g., in a deployed position).

Similarly, in some embodiments, in order to collapse a deployed chair of the invention, a user pulls on the seat lock rod 9, disengaging the seat lock rod 9 from the seat lock spring 28. This allows a user to pivot the seat frame 5 into a closed position (e.g., a position in which the seat is more or less perpendicular to the surface upon which the chair resides), causing the seat lock rod 9 to move upward in the tracks 74 in the back legs 23. A user can push up on the seat frame 5 to lock the seat lock bar 9 with the seat lock spring 28 (e.g., in a collapsed position).

In some embodiments, the present invention comprises an oxygen bottle holder (e.g., for attachment of an oxygen bottle to a chair described herein. The present invention is not limited to any particular attachment point. Indeed, any position on a chair where an oxygen bottle can be stored and accessed is contemplated to be satisfactory for attachment. In some embodiments, an oxygen bottle holder 59 is mounted between the inner wheel plates 38 using existing holes/hardware. Hook and loop cinching straps run through slots in the O2 bottle holder 59 to secure the oxygen bottle.

In some embodiments, in order to transfer a subject using a chair provided herein (e.g., to load a subject onto the chair, transport the subject (e.g., up and/or down a surface)), a user of a chair of the invention positions the chair as close as possible to the subject. The user then positions the front wheels and/or casters parallel with the object from which the subject is to be transferred (e.g., a bed, a chair, a table, etc.). Rear wheel locks are applied. The foot support is placed in a stowed position and restraints if present are positioned such that they do not interfere with transferring of a subject onto the chair. Next, a user assists a subject onto the chair (e.g., using approved EMS procedures and/or following a local and/or national protocol). In some embodiments (e.g., due to the health, size, or other subject feature, or, due to the surrounding environment (e.g., space limitations)), it is easiest or necessary to assist a subject onto a chair provided herein in such a way that the subject is initially placed on the chair with the subject's legs and feet positioned on a side of the swivel seat (e.g., they are positioned such that their body is sideways facing (e.g., to the left or right) rather than forward facing). Thus, once a subject is loaded in this way, the subject can then be rotated into a forward facing position using the swivel seat provided herein (e.g., without having to move a portion of a subjects body independently of the chair, the user of the chair can swivel the seat and at the same time, move the subject situated thereon to a forward facing position). Once a subject is forward facing, the foot support is lowered and the subject is secured to the chair using one or more restraints described herein. The wheel locks are released and the user transports the subject. Similarly, due to patient condition or space limitations, a subject can be unloaded from a chair described herein by first moving a subject from a forward facing position to a sideways facing position using a swivel seat provided herein.

Figure 9:
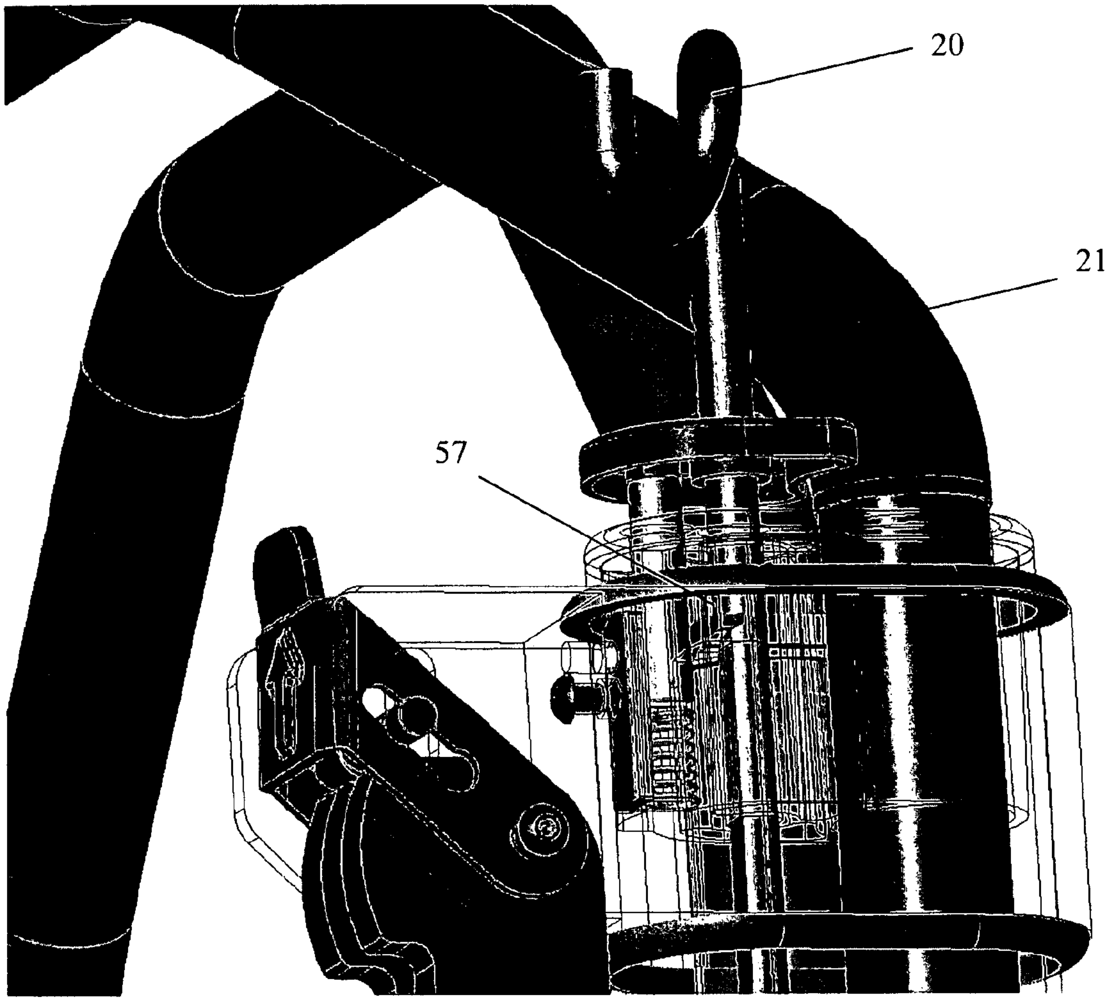
FIG. 9 shows components of a telescoping IV pole in a stowed position of a chair according to the invention.
Figure 10:
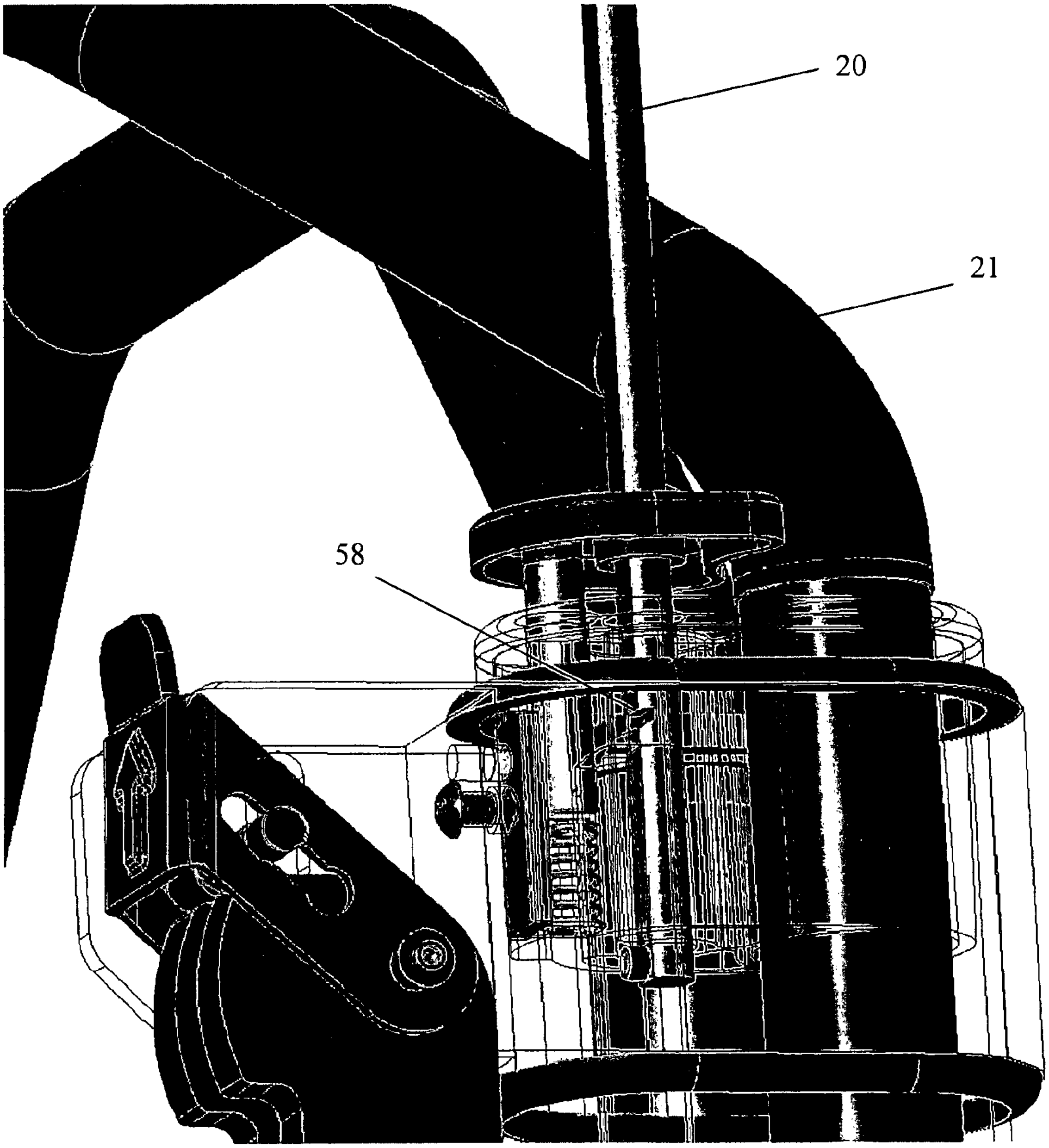
FIG. 10 shows components of a telescoping IV pole in a deployed position of a chair according to the invention.
Figure 11:
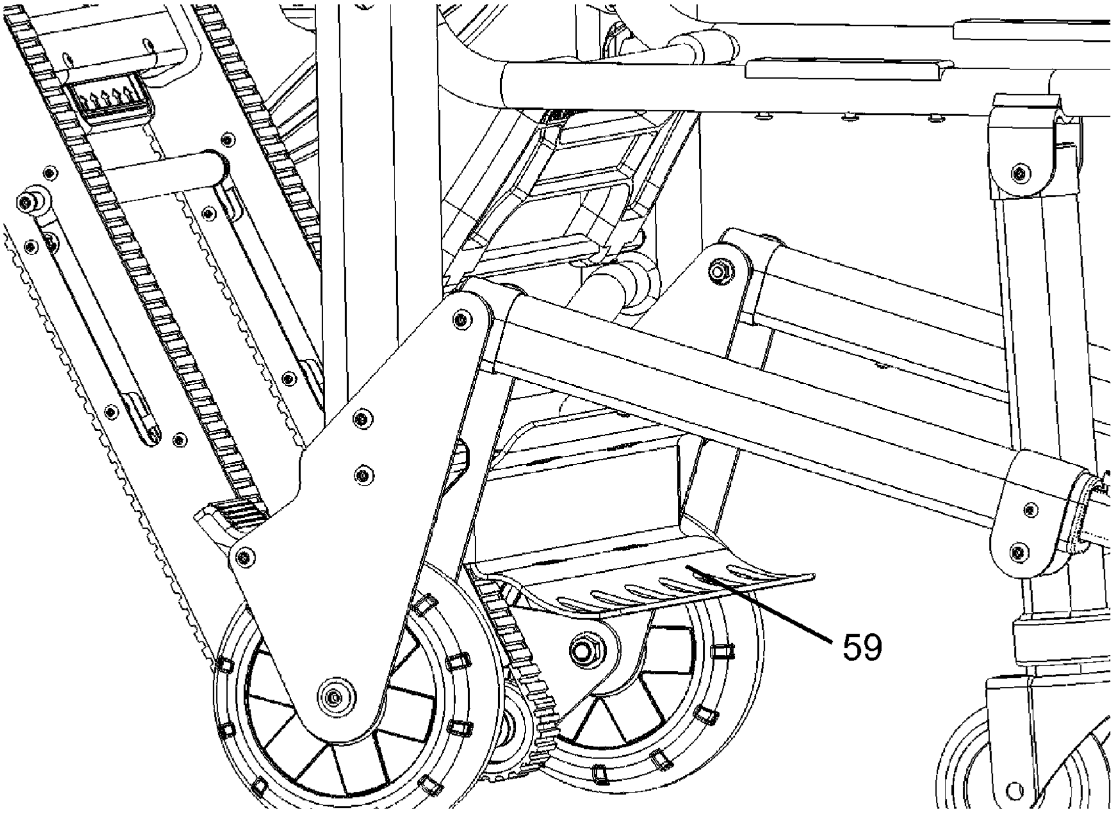
FIG. 11 shows an optional oxygen bottle holder of a chair according to the invention.

In some embodiments, a chair of the invention comprises an intravenous (IV) pole 20 (e.g., as shown in FIGS. 1, 2, 3, 4, 9, 10 and 15). The IV pole 20 is located in a rear leg 23 and is attached to an IV pole release button 21 attached to a spring loaded locking means as shown in FIGS. 9 and 10. In some embodiments, when a user presses down on the IV pole release button 21, this pulls a pivoting latch from notches 57, 58 in the IV pole 20 allowing it to be raised or lowered (e.g., manually raised or lowered). The spring forces the button to return and pivots the latch back into position to catch the notches 57, 58 in the IV pole. In some embodiments, an IV pole 20 comprises a stowed IV pole notch 57 and a deployed IV pole notch 58. In some embodiments, an IV pole 20 may comprise a plurality of notches that allow a user to set the IV pole 20 at any one of a plurality (e.g., 2, 3, 4, or more) of heights.

Figure 15:
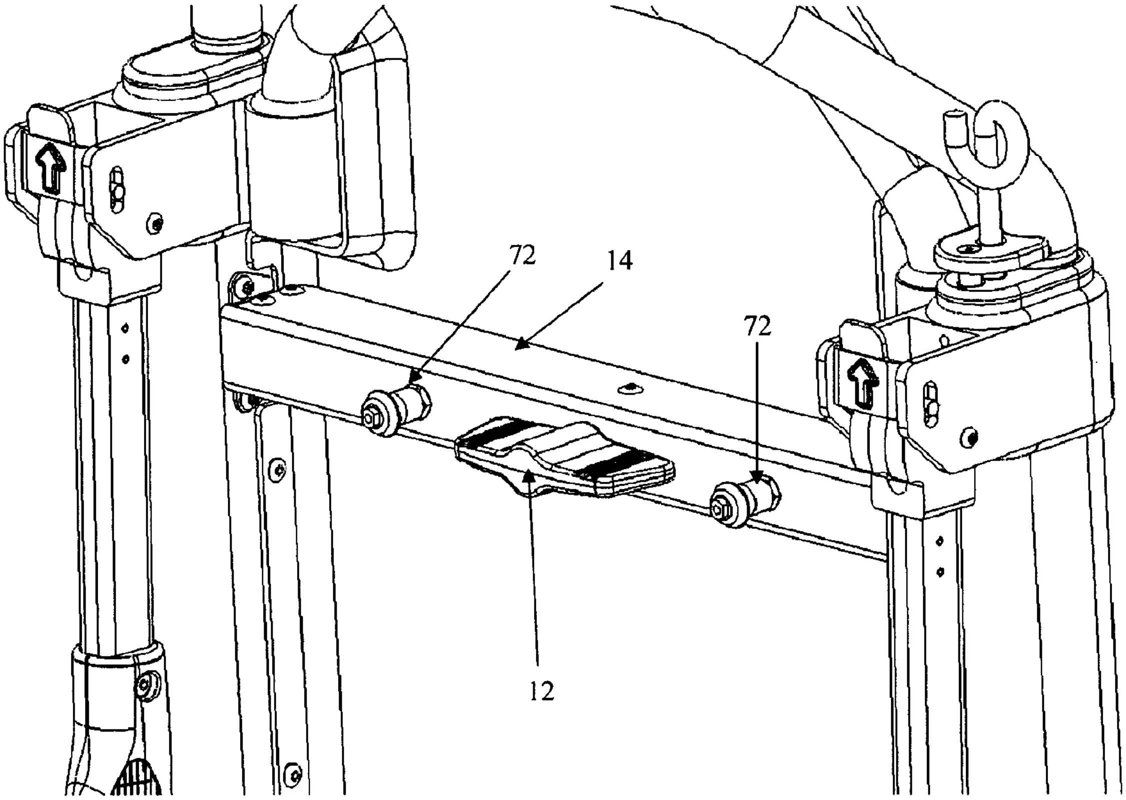
FIG. 15 shows components of a cot including a back brace and restraint attachment points of a shoulder restraint system in one embodiment of the invention.
Figure 18:
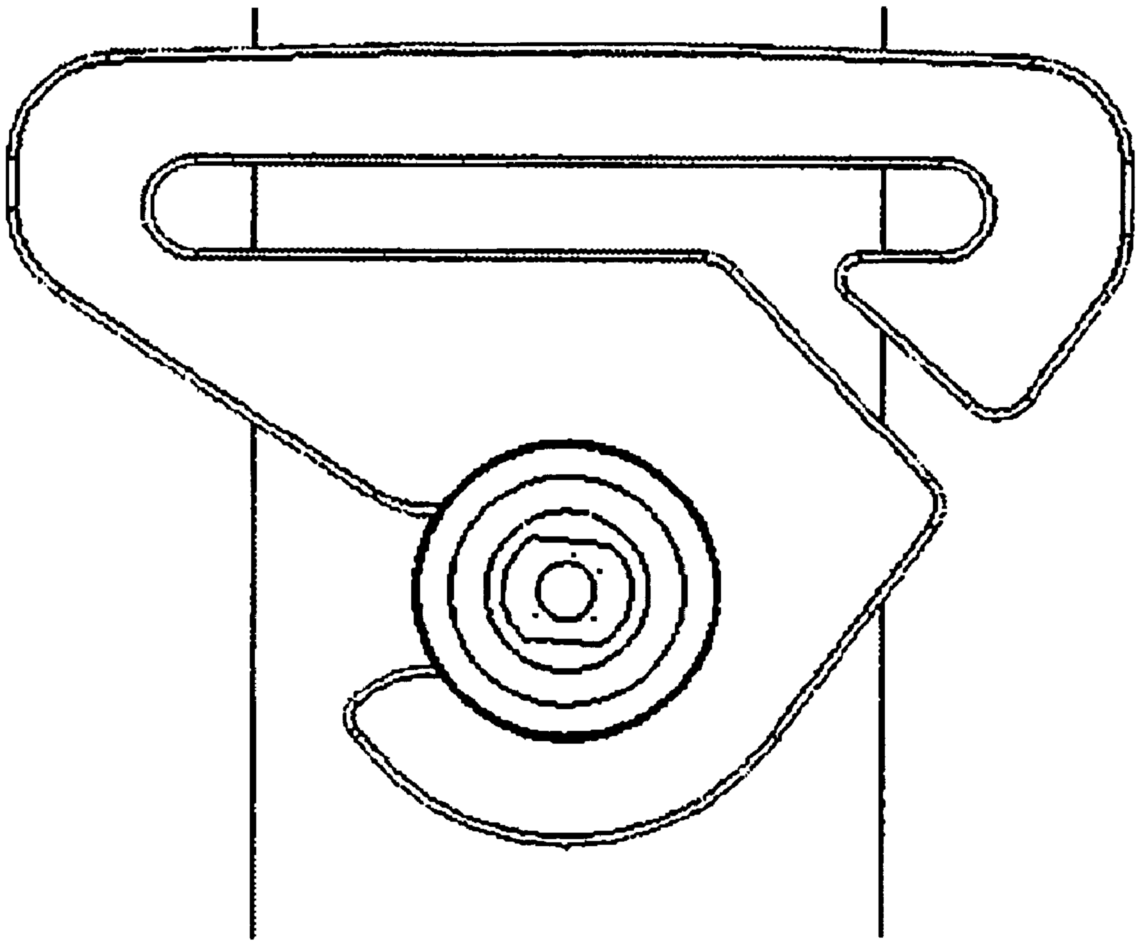
FIG. 18 shows components of a restraint system of the present invention.
Figure 19:
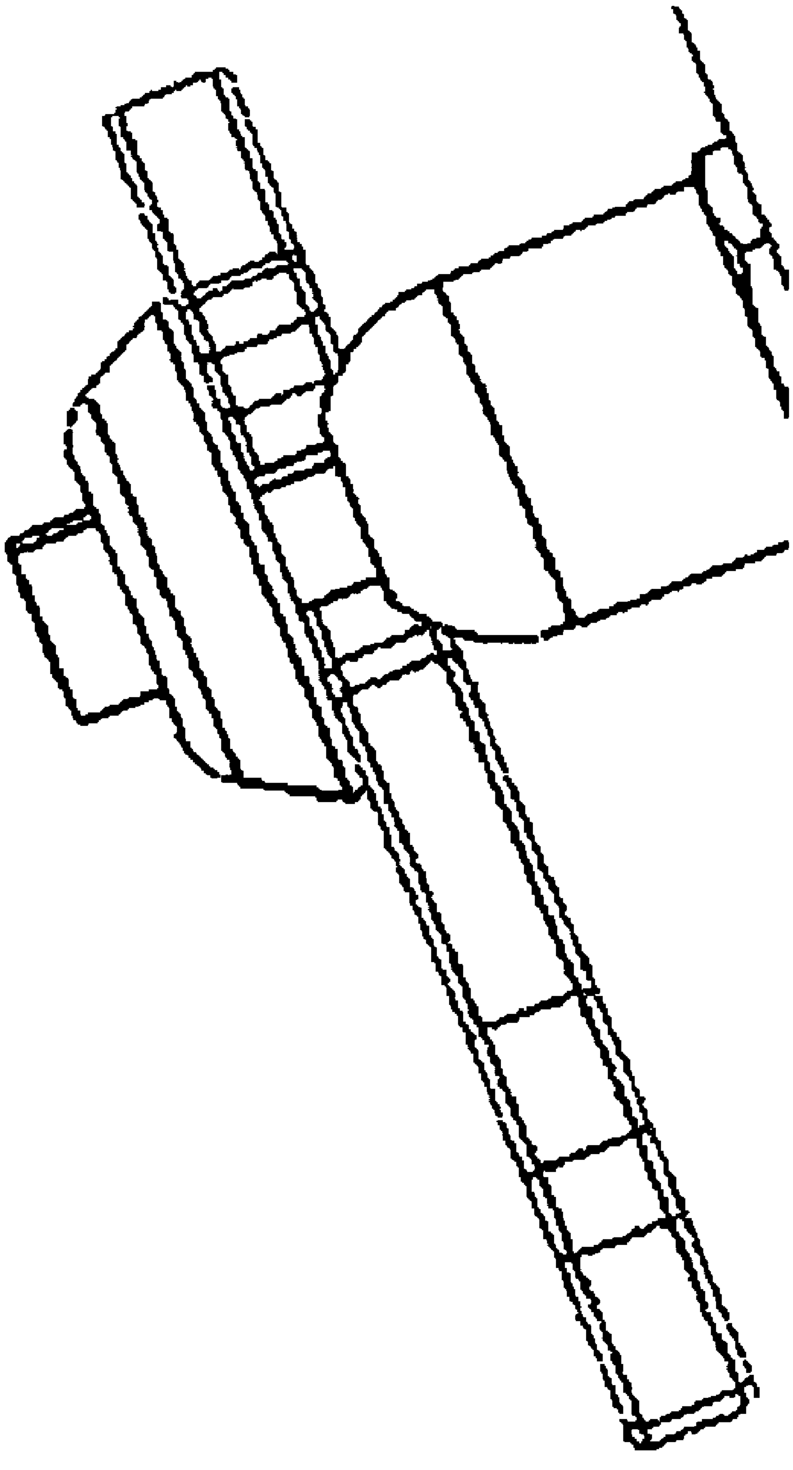
FIG. 19 shows components of a restraint system of the present invention.
Figure 20:
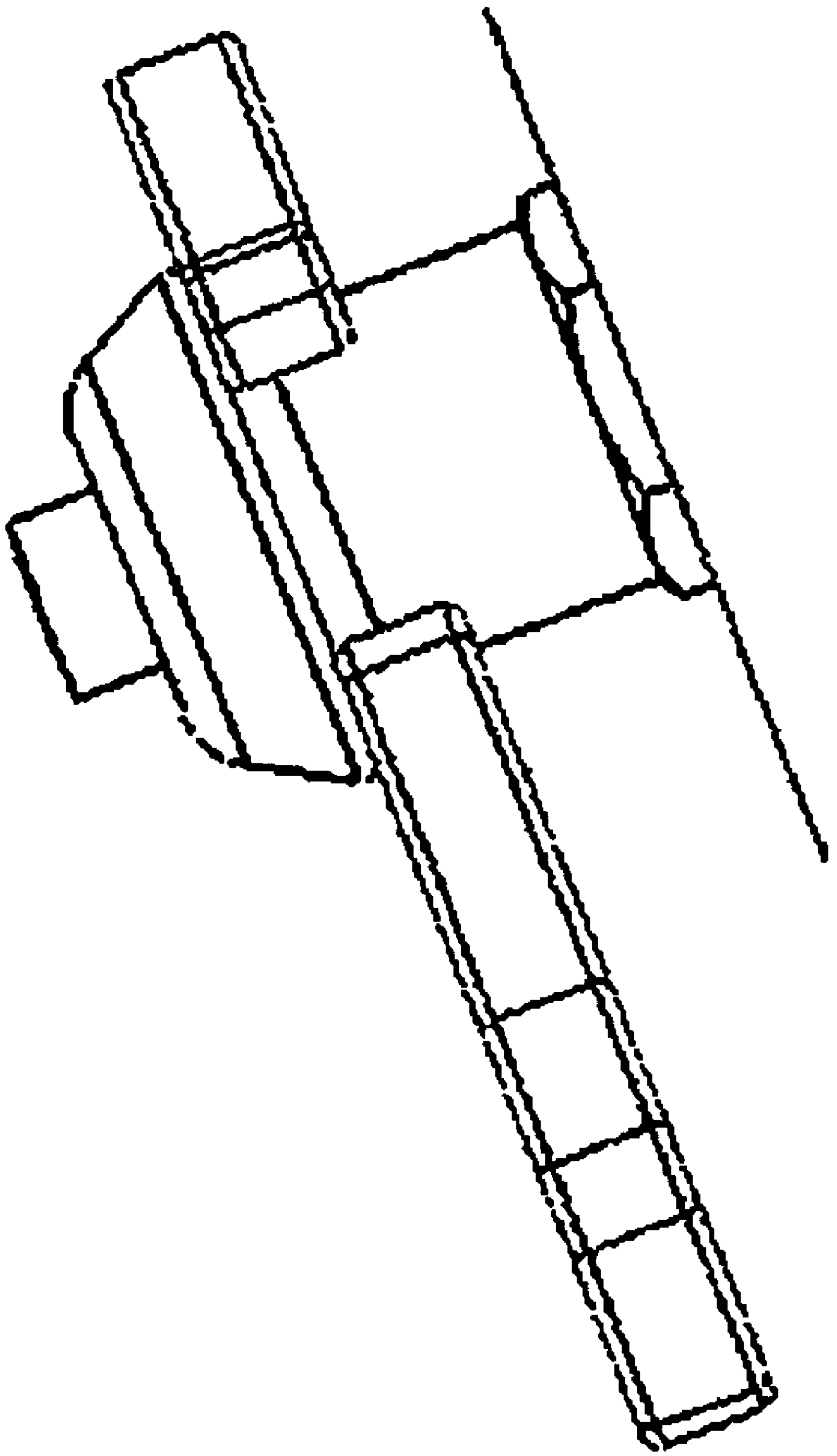
FIG. 20 shows components of a restraint system of the present invention.
Figure 21:
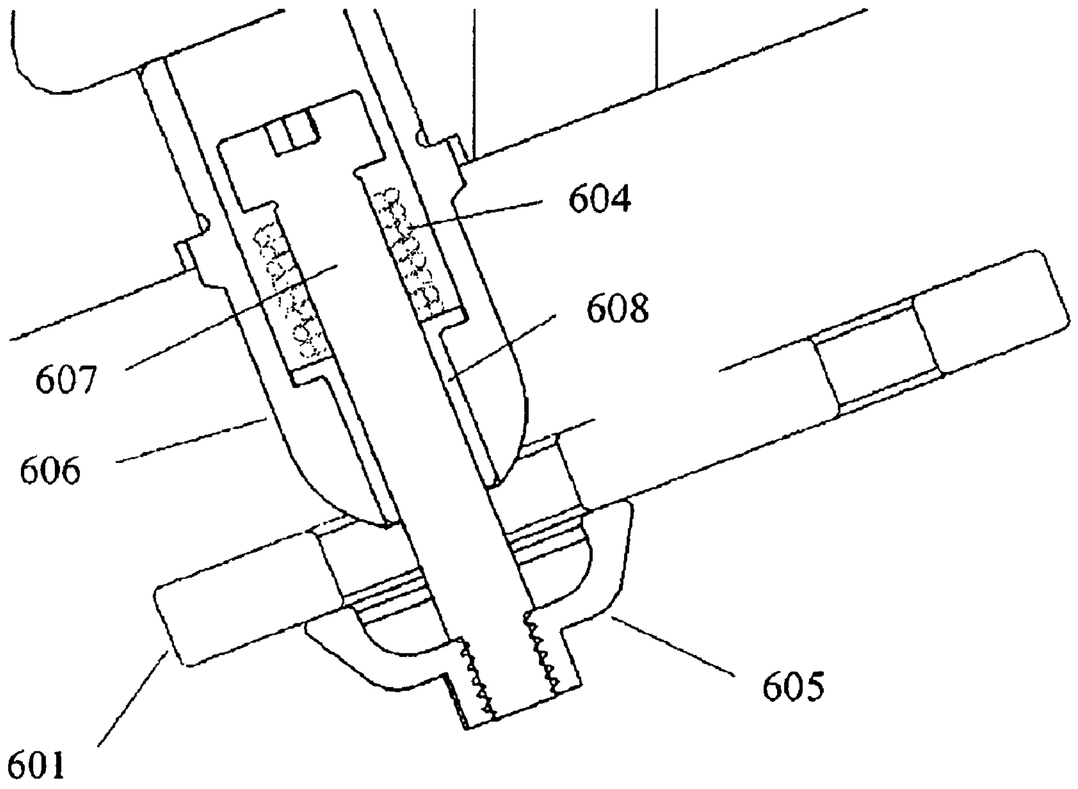
FIG. 21 shows components of a restraint system of the present invention.
Figure 22:
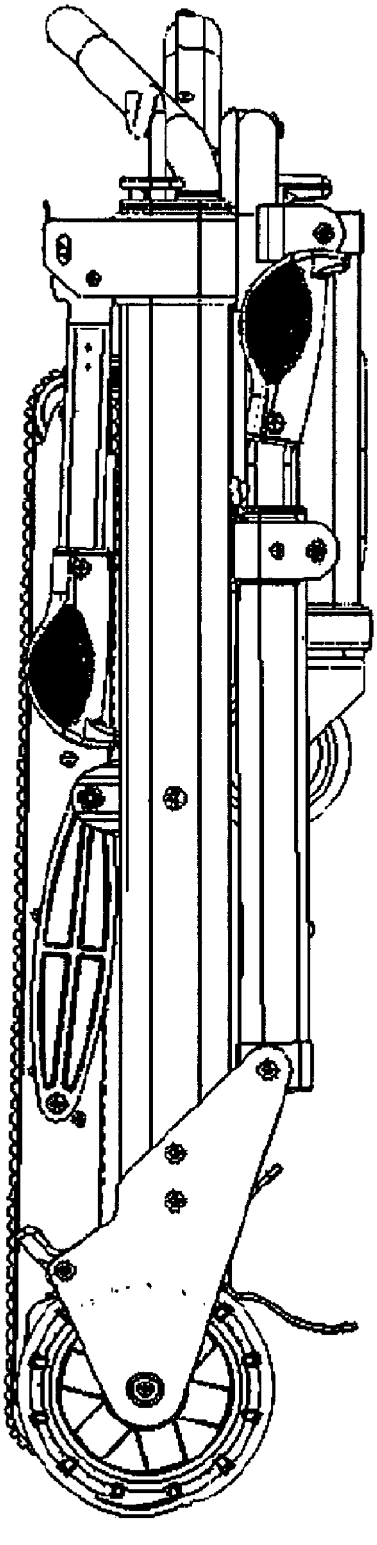
FIG. 22 shows a diagram of a chair of the invention in a folded/collapsed position.
Figure 23:
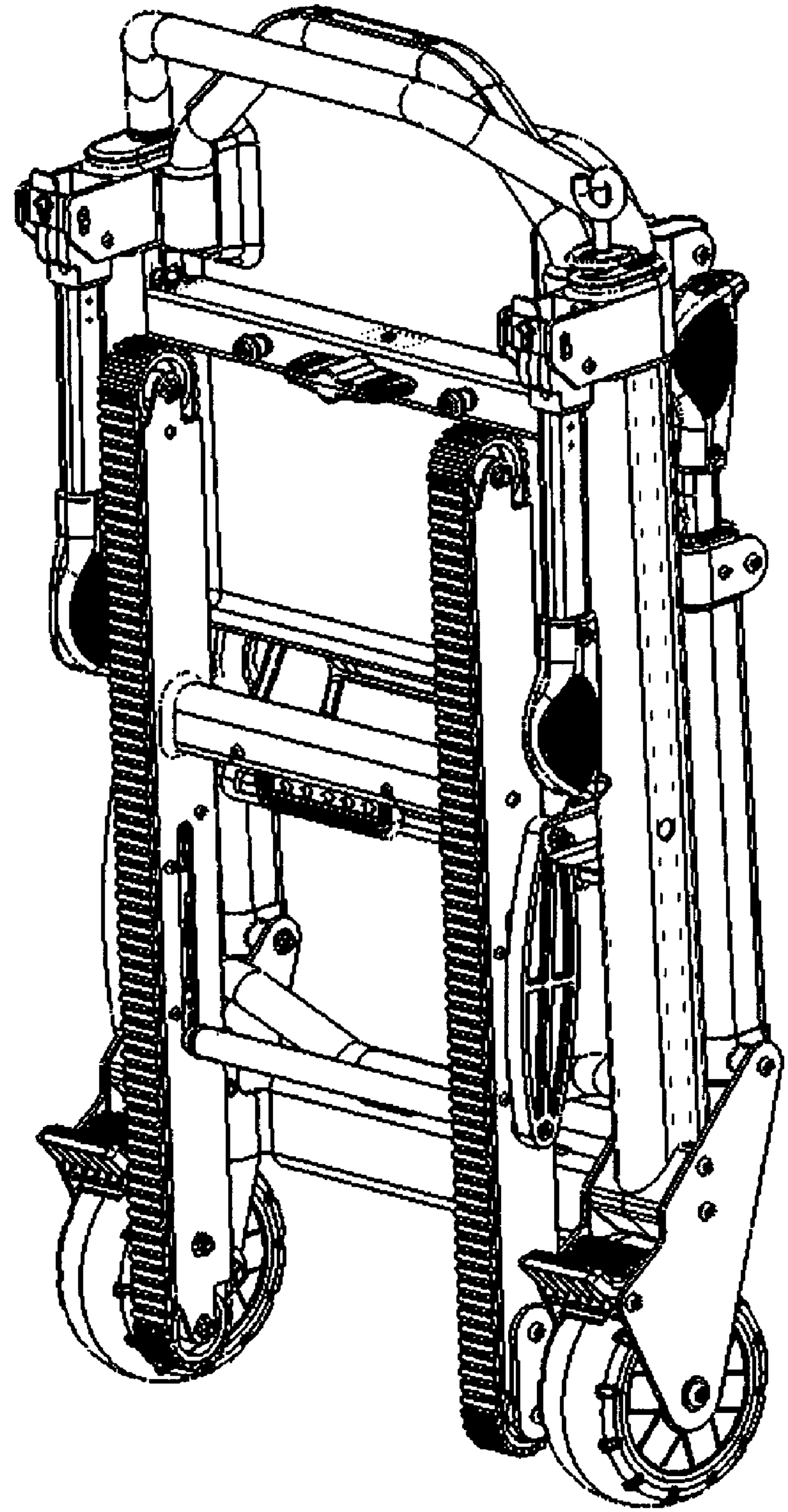
FIG. 23 shows a diagram of a chair of the present invention in a folded/collapsed position.

In some embodiments, the present invention provide a restraint system comprising a restraint clip 600 (e.g., shown in FIGS. 17 and 18) and a restraint clip anchoring assembly 72 (e.g., shown in FIG. 15). In some embodiments, a restraint belt is fastened (e.g., sewn on) to the clip 600 (e.g., fastened to the belt attachment slot 609). In some embodiments, the restraint system functions via a spring present in the anchoring system 604 snapping an anchoring cap 605 tight to the bottom of an anchoring body 606, thereby retaining the clip 600 (e.g., as shown in FIGS. 18-20). To engage the clip 600 on the body 606, the clip 600 is pressed down on the anchor cap 605 with the clip 600 and snapping it around a shaft component 607 present within the body 606. In some embodiments, a bushing 608 surrounds the shaft 607.

In some embodiments, the body 606 is designed with a spherical "bullet nose" end. This design provides several advantages including, but not limited to, functioning to automatically center the clip 600 during installation, as well as to effectively reduce the diameter of the body 606 (e.g., so that when the cap 605 is pressed down, the choke point 601 on the clip 600 passes over the body 606). The choke point 601 is smaller than the body 606 diameter, therefore the clip 600 cannot be removed unless the cap 605 is first pushed down.

In some embodiments, the cap 605 is designed with a cavity in order to push the clip 600 higher up on the body 606. The clip 600 contacts (e.g., engages) the cylindrical shaft 607 portion of the body 606, not the spherical portion (e.g., of the cap 605). This prevents the clip 600 from becoming unintentionally removed.

In some embodiments, to engage the restraint system, one holds the restraint clip 600 near the bottom, and using a surface 602, pushes down the cap 605, allowing the clip 600 to engage the body 606 (e.g., the shaft 607 within the body 606). In order to remove/release, one holds the restraint clip 600, pushes down on the cap 605, and slides the clip 600 away from the body 606. Thus, a restraint system of the present invention provides for a user to use only a single hand to install/engage and/or remove/release the restraint. For example, to remove requires only two motions; one to push down the cap, the other a sideways motion to remove the clip. In some embodiments, forces on the belt can only be in tension and will not act in a sideways manner, thus the clip cannot become disengaged accidentally through use.

Figure 16:
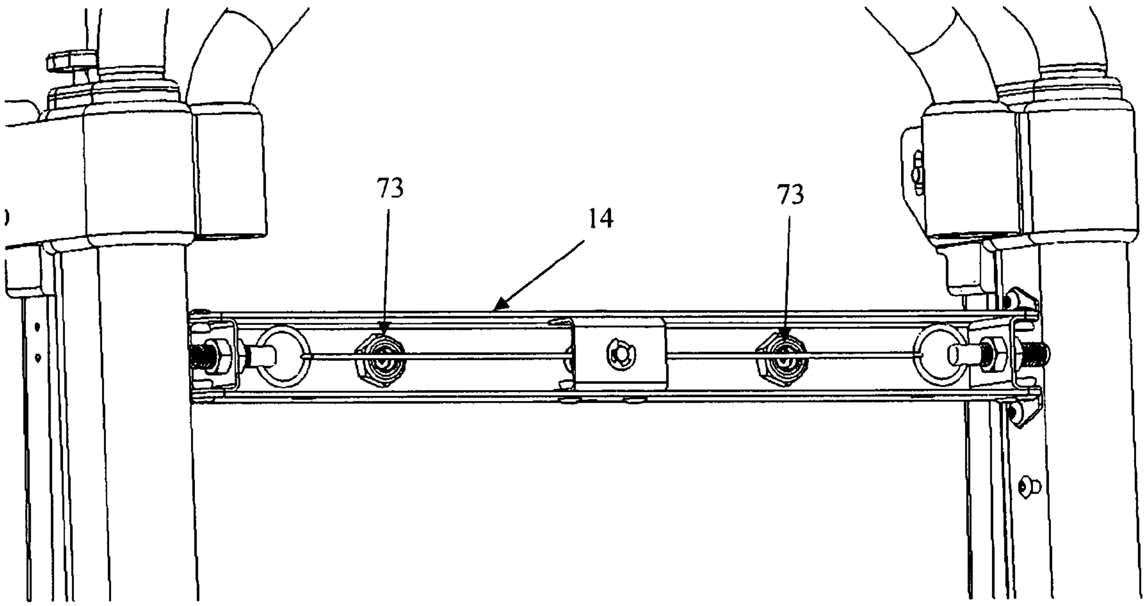
FIG. 16 shows components of a cot including a view of components housed within a back brace in one embodiments of the invention.
Figure 17:
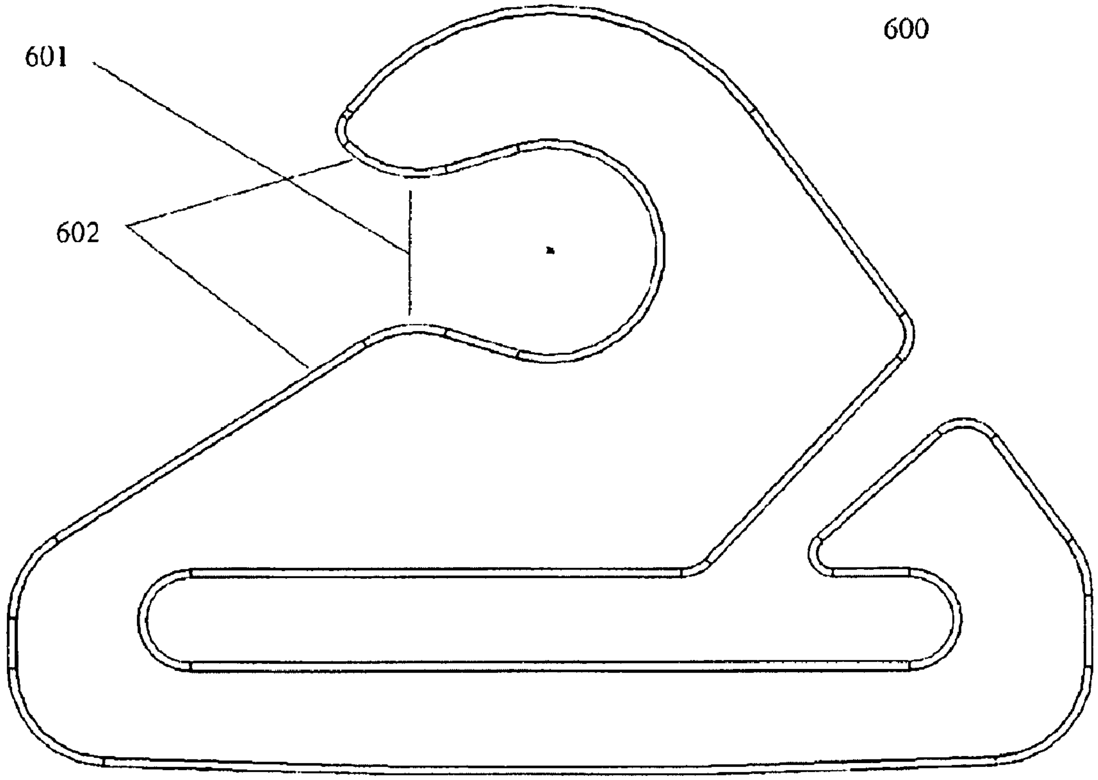
FIG. 17 shows components of a restraint system of the present invention.

FIG. 18-20 show the attachment of a clip 600 to an anchoring assembly 72. In some embodiments, the anchoring assemblies 72 are fastened to the upper back brace 14 as shown in FIGS. 15 and 16. Thus, in some embodiments, the present invention provides a restraint system that allows a user to place one or more restraints upon a subject (e.g., upon the upper torso portion of a subject) such that the restraint only contacts specific regions of a subject transported by the chair.

In some embodiments, in addition to or in place of a shoulder and/or upper torso restraint system, the present invention also provides a lap restraint (e.g., wherein a belt is placed over a subject's legs and fastens the subject securely to the seat. In some embodiments, the lap restraint comprises restraint attachment points (e.g., present on the seat frame 5). In some embodiments, the lap restraint has a quick clip and/or snap clip belt end (e.g., similar to those used in automobile racing) that attach to an anchor (e.g., thereby providing for quick removal). In some embodiments, restraints comprise an antimicrobial substance and/or an impervious material (e.g., that inhibits and/or reduces absorption of bodily fluids (e.g., blood)). In some embodiments, a restraint system of the present invention comprises a sensor and/or alert system (e.g., added to a female or male belt attachment point (e.g., that provides a warning tone when a subject is not strapped in (e.g., prior to and/or upon movement of an ambulance))). In some embodiments, a restraint strap comprises a male attachment point (e.g., so that if the attachment points on the chair line up across a subject's joint (e.g., shoulder, elbow etc.), the strap can attach to itself on a portion of the chair (e.g., thereby avoiding strapping across the joint)).

Having described the invention in detail, those skilled in the art will appreciate that various modifications, alterations, and changes of the invention may be made without departing from the spirit and scope of the present invention. Therefore, it is not intended that the scope of the invention be limited to the specific embodiments illustrated and described.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields, are intended to be within the scope of the following claims.

We claim:

1. A stair chair comprising a seat assembly comprising a fixed back seat portion and a swivel seat assembly comprising a swivel seat, wherein the swivel seat assembly comprises a swivel seat base attached to the seat frame of the stair chair, wherein a plurality of seat glides are attached to the seat frame.

2. The stair chair of claim 1, wherein a turntable bearing assembly is attached to the seat base.

3. The stair chair of claim 2, wherein a seat pivot point is centered within the turntable bearing assembly.

4. The stair chair of claim 2, wherein a seat plate and a plurality of seat pan portions are attached to the turntable bearing assembly.

5. The stair char of claim 4, wherein the seat pan portions attach to the swivel seat and to the seat plate, and rotatably move along the seat glides.

6. The stair chair of claim 1, wherein the chair comprises one or more quick clip restraint anchors, wherein the anchors comprise an anchor spring, an anchor cap, an anchor body, an anchor shaft and an anchor bushing, wherein the spring, cap, body, shaft and bushing are configured to provide a restraint clip choke point.

* * * * *